Patented Oct. 6, 1936

2,056,830

UNITED STATES PATENT OFFICE 2,056,830

PREPARATION OF POLYGLYCOLS

Gerald H. Coleman and Garnett V. Moore, Midland, Mich., assignors to The Dow Chemical Company, Midland, Mich., a corporation of Michigan No Drawing. Application September 11, 1934, Serial No. 743,616

14 Claims. (Cl. 260—151)

This invention concerns a method of preparing polyglycols, particularly polyethylene glycols, by partial dehydration of the corresponding simple glycols in the presence of dehydration catalysts. By a "dehydration catalyst" we mean a substance which is capable of promoting splitting of water from a simple glycol, e. g. ethylene glycol, with intramolecular formation of glycol ethers when such simple glycol is heated in its presence.

It is known that, when a mixture of ethylene glycol and a dehydration catalyst such as sulphuric acid, etc., is distilled at atmospheric pressure, dioxane

is formed and distills off. In preparing dioxane by such method, we observed that little if any dioxane distills until the mixture is heated above 170° C., although water and a small quantity of organic by-product material, e. g. acetaldehyde, usually distill at lower temperatures.

We have now found that when ethylene glycol is heated with a relatively small proportion of a dehydration catalyst to a reaction temperature below 210° C. under conditions such that no distillation of products can occur at temperatures above 170° C., the formation of dioxane is inhibited and polyethylene glycols are formed instead. By similar procedure other polyglycols, e. g. polypropylene glycols, etc., can be produced from corresponding simple glycols, e. g. propylene glycol. Accordingly, the invention consists in the method of preparing polyolefine glycols hereinafter fully described and particularly pointed out in the claims.

In preparing polyethylene glycols by our method, ethylene glycol is heated with a relatively small proportion, e. g. less than about 10 per cent and preferably between 2 and 4 per cent by weight, of a dehydration catalyst at a reaction temperature below 210° C. while preventing distillation of the mixture at temperatures above 170° C. When the mixture is heated at temperatures below 170° C., low boiling products, e. g. water, acetaldehyde, etc., may be permitted to distill therefrom without detriment, since ethylene glycol apparently is not converted to dioxane at such lower temperatures.

As the catalyst, we prefer to use sulphuric acid, or an alkyl sulphate, e. g. monomethyl sulphate, diethyl sulphate, di-isopropyl sulphate, etc., or a sulphonic acid, e. g. ethyl sulphonic acid, chlorosulphonic acid, benzene sulphonic acid, naphthalene sulphonic acid, etc., but other dehydration catalysts, e. g. aluminum chloride, phosphoric acid, sodium acid sulphate, etc., may be employed if desired. The ethylene glycol used should contain less than 10 per cent by weight of water and is preferably anhydrous, since water tends to retard the desired reaction.

The reaction may be carried out in any of the following ways:—

(1) By heating the mixture in a closed reactor at a temperature below 210° C., (2) By heating the mixture under reflux at a temperature below 210° C., (3) By heating the mixture at a temperature below its boiling point, or (4) By heating the mixture at a temperature below 170° C., while simultaneously distilling water therefrom.

The last mentioned procedure (4) appears to produce the polyethylene glycols in highest yield. However, a good yield of polyglycols is obtained by any of the stated procedures. In operating according to said last procedure, the water may be distilled directly from the reacting mixture at atmospheric or reduced pressure, or a water-immiscible solvent, e. g. chlorobenzene, ortho-dichlorobenzene, chlorotoluene, etc., may advantageously be added and a mixture of water and solvent be distilled off during the reaction. By operating in such manner, the reaction proceeds smoothly at temperatures as low as 120° C.

In practice, we find it convenient to heat the reaction mixture under reflux at atmospheric pressure. During such operation the boiling point of the mixture gradually drops, due to the presence of water formed by the reaction. Refluxing is preferably continued until the temperature of the mixture becomes substantially constant.

After completing the reaction, the polyethylene glycol products may be distilled directly from the crude mixture in the presence of the catalyst, provided the distillation is carried out under sufficient vacuum so that the mixture does not become heated above 170° C. However, it frequently is more convenient to neutralize or remove the catalyst, after which the mixture may be distilled at considerably higher temperatures without detriment. The products of the reaction are chiefly diethylene glycol, a somewhat smaller quantity of triethylene glycol, a still smaller quantity of tetraethylene glycol, etc. Such products may be separated from each other by distillation in vacuo.

Although the method described above is particularly well adapted to the production of polyethylene glycols from ethylene glycol, it is not limited thereto. By similar procedure, polypropylene glycols may be prepared from propylene glycol, polybutylene glycols may be prepared from corresponding simple butylene glycols, etc. Likewise, a mixture of polyolefine glycols may be prepared from a mixture of corresponding simple glycols, e. g. a mixture of ethylene glycol and propylene glycol. As is well known, such mixture of simple glycols may be prepared at low cost from the gases obtained by cracking paraffin hydrocarbons.

The following examples illustrate a number of ways in which the principle of our invention has been employed, but are not to be construed as limiting the invention.

Example 1

A mixture of 310 grams (5 moles) of ethylene glycol and 1 gram of concentrated sulphuric acid was heated under reflux at atmospheric pressure for 6 hours. At the start the temperature of the refluxing mixture was 188° C., but at the close of the operation the temperature had dropped to 151° C. The reacted mixture was neutralized with potassium carbonate and then distilled, first at atmospheric pressure until most of the water had been removed, and thereafter under vacuum. There was obtained 227 grams (3.66 boles) of unreacted ethylene glycol and 67.3 grams of a polyethlene glycol mixture consisting largely of diethylene glycol along with smaller quantities of triethylene glycol, tetraethylene glycol, etc.

Example 2

A mixture of 1860 grams (30 moles) of ethylene glycol and 29.4 grams (0.3 mole) of sulphuric acid was heated at 160° C. for 6 hours, the water and low boiling organic by-products, e. g. acetaldehyde and dioxane, being permitted to distill off during such treatment. Thereafter, the reaction mixture was treated with 41.5 grams (0.3 mole) of potassium carbonate and fractionally distilled. There was obtained 874 grams (14.1 moles) of unreacted ethylene glycol, 449 grams (4.24 moles) of diethylene glycol, 150 grams (1.0 mole) of triethylene glycol, and 84.6 grams (0.436 mole) of tetraethylene glycol. The total yield of polyethylene glycols was 83.3 per cent of theoretical, based on the ethylene glycol consumed in the reaction.

The following table sets forth data collected in a number of other experiments wherein polyolefine glycols were prepared from corresponding simple olefine glycols by our method. In carrying out each of said experiments a reaction mixture having the composition stated in the table was heated under reflux at atmospheric pressure for the time and at the temperatures given. The mixture was then treated with sufficient potassium carbonate to destroy or neutralize the catalyst. Thereafter the mixture was distilled, first at atmospheric pressure until the water was largely removed, and then under vacuum to distill the polyglycol products. The polyglycols were not separated from each other. In each experiment described in the table, the weight of olefine glycol consumed is the difference between the weight of olefine glycol employed and the weight of unreacted olefine glycol recovered after the reaction was completed.

Table

| Run No. | Reaction mixture | | | | Reflux temp. °C. | | Time of heating hrs. | Olefine glycol consumed gms. | Polyolefine glycols produced gms. |
| --- | --- | --- | --- | --- | --- | --- | --- | --- | --- |
| | Olefine glycol | | Catalyst | | | | | | |
| | Kind | Wt. gms. | Kind | Wt. gms. | Start | Finish | | | |
| 1 | Ethylene glycol. | 310 | H₂SO₄ | 19.6 | 171 | 130 | 2.5 | 158.5 | 111.5 |
| 2 | ....do........ | 310 | C₆H₅SO₃H | 7.9 | 180 | 141 | 6 | 175.2 | 126.2 |
| 3 | ....do........ | 310 | (CH₃)₂SO₄ | 6.3 | 172 | 143 | 6 | 130.0 | 91.4 |
| 4 | ....do........ | 310 | KHSO₄ | 6.8 | 185 | 171 | 6 | 75.7 | 47.7 |
| 5 | ....do........ | 310 | H₃PO₄ | 4.9 | 191 | 174 | 6 | 34.7 | 29.5 |
| 6 | Propylene..... | 380 | C₆H₅SO₃H | 7.9 | 165 | 125 | 6 | 109.5 | 46.0 |

In the foregoing table, runs 1–5 illustrate the effectiveness of various dehydration catalysts in preparing polyethylene glycols by our method. It will be noted that sulphuric acid, sulphonic acids, and esters thereof are particular active catalysts for such purpose. Run 6 illustrates the preparation of polypropylene glycols from propylene glycol.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:—

1. In a method of making polyglycols, the steps which consist in heating an olefine glycol with less than 10 per cent of its weight of a dehydration catalyst at a reaction temperature below 210° C. while avoiding distillation of the mixture when at a temperature above about 170° C., and separating the polyglycol products from the reacted mixture.

2. In a method of making polyglycols, the steps which consist in heating at a reaction temperature below about 210° C. an olefine glycol with not more than 10 per cent its weight of a dehydration catalyst selected from the class consisting of sulphuric acid, sulphonic acids and esters thereof, while avoiding distilling the mixture when at a temperature above about 170° C., and separating the polyglycol products from the reacted mixture.

3. In a method of making polyglycols, the steps which consist in heating an olefine glycol with less than 10 per cent of its weight of a dehydration catalyst at a reaction temperature below 210° C., while avoiding distilling the mixture when at a temperature above 170° C., thereafter substantially freeing the reacted mixture of said catalyst and separating the polyolefine glycol products from the mixture by distillation.

4. In a method of making polyglycols, the steps which consist in heating an olefine glycol with less than 10 per cent of its weight of a dehydration catalyst at a reaction temperature below 210° C., while avoiding distilling the mixture when at a temperature above 170° C., and thereafter fractionally distilling the mixture under vacuum at a temperature not exceeding 170° C. to separate the polyolefine glycol products therefrom.

5. In a method of making polyglycols, the steps which consist in heating an olefine glycol with a relatively small proportion of a dehydration catalyst at a reaction temperature between about 170° C. and about 210° C. without distillation, and thereafter separating the polyglycol products from the reacted mixture.

6. In a method of making polyglycols, the steps which consist in heating an olefine glycol with a relatively small proportion of a dehydration catalyst with refluxing of all of the vaporized material at approximately atmospheric pressure and thereafter separating the polyolefine glycol products from the reacted mixture.

7. In a method of making polyolefine glycols, the steps which consist in heating an olefine glycol with a relatively small proportion of a dehydration catalyst at a reaction temperature below about 170° C., while gradually distilling water from the mixture, and thereafter separating the polyolefine glycol products from the reacted mixture.

8. In a method of making polyolefine glycols, the steps which consist in heating an olefine glycol with a relatively small proportion of a dehydration catalyst in the presence of a water-immiscible organic solvent, which will form an azeotropic mixture with water, at a reaction temperature below about 170° C., while gradually distilling a mixture of water and said organic solvent from the heated reaction mixture and thereafter separating the polyolefine glycol products from the reacted mixture.

9. In a method of making polyethylene glycols, the steps which consist in heating ethylene glycol with less than 10 per cent of its weight of a dehydration catalyst at a reaction temperature below 210° C., while avoiding distilling the mixture when at a temperature above 170° C., and thereafter separating the polyethylene glycol products from the reacted mixture.

10. In a method of making polyethylene glycols, the steps which consist in heating, at a reaction temperature below 210° C., ethylene glycol with between about 2 and about 4 per cent by weight of a dehydration catalyst selected from the class consisting of sulphuric acid, sulphonic acids, and esters thereof, while avoiding distilling the mixture when at a temperature above 170° C., and thereafter separating the polyethylene glycol products from the reacted mixture.

11. In a method of making polyethylene glycols, the steps which consist in heating ethylene glycol with a relatively small proportion of a dehydration catalyst with refluxing of all of the vaporized material at approximately atmospheric pressure and thereafter separating the polyethylene glycol products from the reacted mixture.

12. In a method of making polyethylene glycols, the steps which consist in heating ethylene glycol with a relatively small proportion of a dehydration catalyst at a reaction temperature below about 170° C. while gradually distilling water from the heated mixture and thereafter separating the polyethylene glycol products from the reacted mixture.

13. In a method of making polyethylene glycols, the steps which consist in heating ethylene glycol with a relatively small proportion of a dehydration catalyst in the presence of a water-immiscible organic solvent, which will form an azeotropic mixture with water, at a reaction temperature below about 170° C. while gradually distilling a mixture of water and said organic solvent from the heated reaction mixture and thereafter separating the polyethylene glycol products from the reacted mixture.

14. In a method of making polyglycols, the steps which consist in heating an olefine glycol with a relatively small proportion of a dehydration catalyst selected from the class consisting of sulphuric acid, sulphonic acids, and esters thereof at a reaction temperature below about 210° C. while avoiding distilling the mixture when at a temperature above about 170° C., and separating the polyglycol products from the reacted mixture.

GERALD H. COLEMAN.
GARNETT V. MOORE.